United States Patent [19]

Habiger

[11] 4,041,702
[45] Aug. 16, 1977

[54] CONTROL SYSTEM FOR A FLUID DRIVE VEHICLE

[75] Inventor: Cyril W. Habiger, Joliet, Ill.

[73] Assignee: Caterpillar Tractor Co., Peoria, Ill.

[21] Appl. No.: 732,673

[22] Filed: Oct. 15, 1976

[51] Int. Cl.² .............................................. F16H 39/46
[52] U.S. Cl. ........................................ 60/431; 60/444; 60/445
[58] Field of Search ................ 60/391, 420, 431, 444, 60/452, 488, 445

[56] References Cited

U.S. PATENT DOCUMENTS

| 3,685,290 | 8/1972 | Krusche | 60/452 |
| 3,898,807 | 8/1975 | Habiger | 60/391 |
| 3,952,512 | 4/1976 | Feller | 60/431 |

*Primary Examiner*—Edgar W. Geoghegan
*Attorney, Agent, or Firm*—John W. Grant

[57] ABSTRACT

A fluid drive vehicle has an engine speed control, a fluid drive transmission having a fluid actuator device for moving a control element from its neutral position progressively to increase the drive ratio, and a control system which includes a first fluid circuit which has a control valve movable from a neutral fluid blocking position progressively to increase the flow of pressurized fluid from an auxiliary pump to the fluid actuator device. A fluid responsive servo mechanism moves the control valve from the neutral position while a fluid motor is operative to move the engine speed control from an idling position to increase the engine speed. A second fluid circuit includes a pressure control valve manually actuatable from a neutral fluid flow blocking position to an actuated position for providing fluid flow therethrough from the auxiliary pump to the servo mechanism and the fluid motor and for regulating and maintaining the pressure of the fluid delivered to the servo mechanism and the fluid motor at a pressure level commensurate with the actuated position, and an inching valve selectively manually actuatable from an open position which permits substantially unrestricted fluid flow to the servo mechanism to an actuated position restricting fluid flow to the servo mechanism for reducing the pressure of the fluid delivered to the servo mechanism while maintaining the pressure of the fluid directed to the fluid motor at the pressure level determined by the pressure control valve.

17 Claims, 1 Drawing Figure

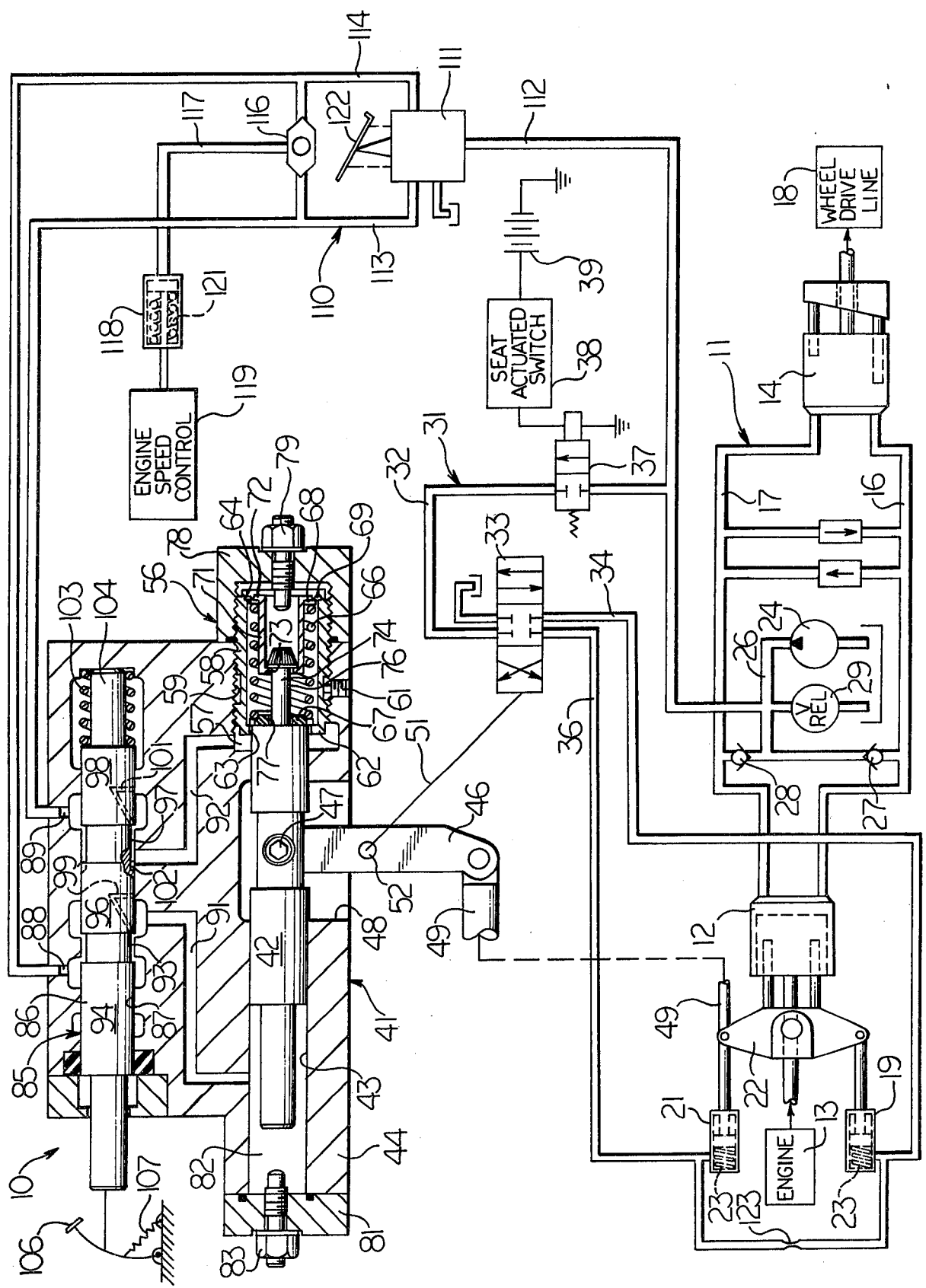

CONTROL SYSTEM FOR A FLUID DRIVE VEHICLE

BACKGROUND OF THE INVENTION

This invention relates to a fluid drive vehicle and more particularly to a fluid actuated control system which provides simultanoeus and coordinated control of engine speed, transmission drive ratio and direction of travel with a single control and an override device for control of the transmission drive ratio without affecting engine speed.

Many forms of industrial and earthmoving vehicles are often provided with hydrostatic transmissions for coupling the engine to the drive shaft or other running gear of the vehicle. On some of those vehicles, particularly lift trucks and loaders, it is desirable to be able to simultaneously control the engine speed, vehicle speed and direction of travel with a single pedal to free the operator's hands for controlling other vehicular controls. It is also desirable to have an override control to reduce the vehicle speed without affecting the position of the single pedal and/or engine speed. Heretofore, the pedal has been connected to the transmission controls and engine speed controls through a mechanical linkage. However, one disadvantage of such mechanical linkages is that they are difficult to install, adjust and service, and the forces required to actuate the pedal are relatively high thereby contributing greatly to operator fatigue. Also, with such linkages, a different linkage arrangement is generally required for every vehicle model. This requires an inventory of a greater number of parts to provide for servicing and replacement of worn and broken parts.

OBJECTS OF THE INVENTION

Accordingly, it is an object of this invention to provide an improved control system for a fluid drive vehicle which provides coordinated control of engine speed, transmission drive ratio and drive direction through a single operator controlled member.

Another object of this invention is to provide such an improved override control for reducing vehicle speed while maintaining engine speed at a preset level as determined by the position of the single operator controlled member.

Another object of this invention is to provide an improved control system of the character described which is easy to operate with relatively low operator input forces and is readily adaptable to several vehicle models with a minimum of changes thereto.

Another object of this invention is to provide an override control which provides a null adjustment for assuring the fluid drive transmission is always returned to a neutral position when the single operator controlled member is released.

Other objects and advantages of this invention will become more readily apparent upon reference to the accompanying drawing and following description.

BRIEF DESCRIPTION OF THE DRAWING

The sole FIGURE is a schematic representation of the control system for a fluid drive vehicle embodying the principles of the present invention with portions shown in cross section for illustrative convenience.

DESCRIPTION OF THE PREFERRED EMBODIMENT

Referring now to the drawing, a control system for a fluid drive vehicle is generally indicated by the reference numeral 10 in association with a hydrostatic transmission 11 of a vehcile, not shown. The fluid drive arrangement includes an overcenter variable displacement fluid pump 12 driven by an engine 13. The fluid pump is in fluid communication with a fluid drive motor 14 through a pair of conduits 16 and 17 which make up a closed loop fluid circuit between the pump and motor. The drive motor is drivingly connected to a wheel drive line 18 which drives one or more wheels, not shown, of the vehicle in the usual manner. The output of the pump is controlled by a pair of hydraulic actuators 19 and 21 operatively attached to a pivotal swash plate 22 of the pump. Directing fluid to the hydraulic actuator 21 causes it to pivot the swash plate to change the inclination thereof causing the pump to drive the motor in a forward direction. Conversely, directing fluid to the hydraulic actuator 19 causes it to pivot the swash plate in the opposite direction and establish reverse drive through the drive motor. The effective drive ratio through the transmission is determined by the amount of inclination of the swash plate in either selected direction. Each of the hydraulic acutators has a spring 23 disposed therein to resiliently return the swash plate to the neutral position shown in the absence of hydraulic fluid to either of the fluid actuators to establish a neutral condition of the hydrostatic transmission.

An auxiliary make up pump 24 is driven by the engine 13 and is connected to both the conduits 16 and 17 through an output line 26 and a pair of check valves 27 and 28. A relief valve 29 is connected between the line and a fluid supply tank to maintain the pressure in the closed loop at a preselected minimum value.

A first fluid circuit 31 connects the auxiliary pump 24 to the fluid actuators 19 and 21 and includes a conduit 32 which connects the output line 26 to a directional control valve 33 movable in both directions from a neutral position shown. A pair of conduits 34 and 36 connect the directional control valve to the fluid actuators 19 and 21, respectively. A solenoid actuated valve 37 is disposed in the conduit 32 and is spring loaded to a closed position to block the flow of fluid through the conduit and hence to the directional control valve and the hydraulic actuators to cause the hydrostatic transmission to be neutralized. A seat actuated switch 38 is serially connected between the solenoid valve and a battery 39 such that when the seat is occupied by the vehicle operator, the switch is closed to complete the electrical circuit to energize the solenoid valve. Energizing the solenoid valve shifts it to an open position permitting fluid flow through the conduit 32 for normal operation of the hydrostatic transmission.

A servo pilot mechanism 41 includes a double acting servo pilot piston 42 reciprocatably disposed within a bore 43 of a housing 44. A lever 46 has one end pivotally connected to the piston at a privot 47 and extends outwardly through an opening 48 in the housing with its opposite end being connected to the swash plate 22 through an elongated connecting link 49. A follow-up link 51 has one end pivotally connected to the lever at a pivot 52 disposed intermediate the ends of the lever and has its other end suitably connected to the directional control valve 33. Although the directional control valve is schematically shown separate from the servo pilot mechanism, alternatively, it may be physically located in the servo pilot mechanism housing 44 with the lever being suitably attached to the directional control valve in any conventional manner.

A centering mechanism 56 is contained within an actuating chamber 57 formed in the housing 44 at one end of the bore 43 and acts to urge the servo pilot piston 42 to a neutral or centered position. An externally threaded sleeve 58 is screw threaded into a threaded bore 59 which is formed in the housing in alignment with the bore 43. The sleeve is retained in a fixed position by a set screw 61. An inner end 62 of the sleeve has a bore 63 extending therethrough while the outer end is provided with an annular groove 64 formed in an inner cylindrical surface. A compression spring 66 is disposed inside the sleeve and is retained in a compressed state between a spring seat 67 normally in abutment with the inner end 62 and an annular retaining ring 68 normally in abutment with a snap ring 69 seated in the annular groove. With the servo piston 42 in the centered position shown an end of the piston extends through the bore 63 for abutment with the spring seat. A tubular member 71 extends through the central opening of the retaining ring 68 and into the spring and has an outwardly extending flange 72 formed at the outer end for abutment with the annular retaining ring. The inner end is provided with a bore 73 which slidably receives a shank 74 of a guide bolt 76. The shank 74 also extends through a central bore 77 formed in the spring seat 67 with the bolt screw threadably secured to the end of the piston. A cap 78 is screw threaded onto the outer end of the threaded sleeve and sealingly engages the housing 44. An adjustable stop member 79 is screw threadably fastened to the cap and extends into the inner bore of the tubular member 71. An end plate 81 is suitably secured to the opposite side of the housing 44 forming an actuating chamber 82 at the opposite end of the servo piston. A second adjustable stop member 83 is threadably secured to the end plate and extends into the actuating chamber.

A creeper or inching valve 85 includes an inching valve spool 86 slidably disposed within a bore 87 formed in the housing parallel to the bore 43. The spool is operative to control fluid communication between a pair of inlet-outlet ports 88 and 89 and a pair of passageways 91 and 92, respectively, which are connected to the actuating chambers 82 and 57, respectively. The spool has a first annular groove 93 formed therein between a pair of lands 94 and 96 and a second annular groove 97 formed between the land 96 and another land 98. A first fluid flow passage 99 is formed in the land 96 and communicates the first annular groove to the peripheral surface of the land 96. A second fluid flow passage 101 is formed in the land 98 and communicates the second annular groove to the peripheral surface of the land 98. A plurality of throttling slots 102 are formed in the land 96 adjacent to and communicating with the second annular groove. A coil spring 103 circumscribes an extension 104 formed on one end of the spool for resiliently biasing the spool to the left as viewed in the drawing. The opposite end of the spool is suitably operatively attached to an inching control pedal 106. A spring 107 is operatively attached to the control pedal with the force of the spring being sufficient to overcome the force of the spring 103 such that the inching valve spool is normally maintained in the open position shown whereby fluid communication is established between inlet-outlet port 88 and passageway 91 and inlet-outlet port 89 and passageway 92.

The inching valve 85 forms a part of a second fluid circuit 110 connecting the auxiliary pump 24 to the servo mechanism 41. The second fluid circuit includes a pressure control valve in the form of a pressure reducing valve 111 connected to the outlet line 26 through a conduit 112. A pair of conduits 113 and 114 connect the pressure reducing valve to the inlet-outlet ports 89 and 88, respectively. A pressure responsive or shuttle valve 116 connects the conduits 113 and 114 to a conduit 117 which is in turn connected to a hydraulic motor or actuator 118. The hydraulic actuator is suitably connected to an engine speed control 119 such as a butterfly valve of a carburetor or a fuel control member of a governor. A spring 121 is contained within the hydraulic actuator to resiliently bias the engine speed control to an idling position. A foot treadle or pedal 122 is suitably secured to the pressure reducing valve 111 for forward and backward rocking movement for actuating the pressure reducing valve.

OPERATION

While the operation of the present invention is believed clearly apparent from the foregoing description, further amplification will subsequently be made in the following brief summary of such operation. During normal operation of the vehicle, the operator seat is occupied so that the switch 38 is closed completing the electrical circuit to energize the solenoid valve 37 which is actuated to the open position providing fluid flow through the conduit 32 to the directional control valve 33. However, in the absence of fluid pressure in either actuating chamber 57 or 82, the centering mechanism 56 centers the servo pilot piston 42 and hence the directional control valve 33 in a neutral position. Under this condition, pressurized fluid from the auxiliary pump 24 is blocked from both fluid actuators 19 or 21 by the directional control valve and the springs 23 of the actuators center the pump swash plate 22. To shift the hydrostatic transmission 11 to a forward drive ratio, the foot pedal 122 is rocked counterclockwise to actuate the pressure reducing valve 111 from its neutral or fluid blocking position in a forward direction to direct pressurized fluid at a controlled regulated pressure through the conduit 113, inlet-outlet port 89, second annular groove 97, passageway 92 and into the actuating chamber 57 where it urges the servo pilot piston to the left against the bias of the centering spring 66. The amount of movement of the servo pilot piston is dependent upon the pressure level of the fluid in the actuating chamber, which pressure level being established by controlling the amount of actuation of the pressure reducing valve. Upon movement of the servo pilot piston, initially the link 49 connected to the swash plate 22 acts as a fixed pivot for the lower end of the lever 46 which pivots thereabout. In so doing, the follow-up link 51 moves the directional control valve 33 to the left. This admits pressurized fluid to the hydraulic actuator 21 through the conduit 36 and connects the hydraulic actuator 19 to the tank through the conduit 34. Accordingly, actuator 21 extends and actuator 19 retracts thereby inclining the pump swash plate 22 to cause the pump 12 to drive the drive motor 18 in the forward direction with an effective drive ratio determined by the degree of inclination of the swash plate.

The follow-up link 51 provides a follow-up action whereby extension of the actuator 21 occurs only to an extent determined by the amount of leftward movement of the servo pilot piston 42 which movement being controlled by the operator through the pedal 122. This follow-up action results since as swash plate 22 is shifted in the above-described manner, the link 49 pivots the lever 46 counterclockwise about the pivot 47 causing the follow-up link 51 to move the directional control valve 33 in the reverse direction toward its neutral position. Thus, the feedback motion continually attempts to return the directional control valve toward the neutral position and extension of the actuator 21 can continue only while leftward movement of the servo piston 42 is continued. The directional control valve does not return completely to the neutral position after the servo piston stops moving but stops just short of such position at the point where fluid flow to the energized actuator is just sufficient to compensate for the leakage through an orifice 123. Thus, as practical matter, progressive shifting of the pump swash plate continues only as long as the operator is rocking the foot pedal 122 in the counterclockwise direction and the inclination of the swash plate is determined by the amount the operator has rocked the foot pedal, thereby enabling the operator to control the drive ratio of the transmission.

To shift the hydrostatic transmission 11 to a reverse drive ratio, the foot pedal 122 is rocked clockwise to direct pressurized fluid through the conduit 114, inlet-outlet port 88, first annular groove 93, passageway 91 and into the actuating chamber 82 where the pressurized fluid urges the servo pilot piston 42 to the right against the bias of the centering spring 66. This shifts the directional control valve 33 to the right causing the swash plate 22 to shift in the opposite direction and establish reverse drive through the transmission in a manner similar to that described above in regards to shifting the transmission to the forward drive ratio.

Rocking movement of the pedal 122 and thus actuation of the pressure reducing valve 111 in either direction to progressively increase the transmission drive ratio in either direction also simultaneously causes a coordinated progressive increase in engine speed. This is accomplished by the shuttle valve 116 which auotmatically connects whichever conduit 113 or 114 having the greatest fluid pressure therein to the conduit 117 so that pressurized fluid is directed to the fluid actuator 118 to move the engine speed control 119 to increase engine speed. The fluid pressure in the conduit 117 will be equal to the pressure of the fluid in the conduit 113 or 114 and the engine speed control will be moved an amount dependent upon the fluid pressure in the conduit 113 or 114.

With the hydrostatic transmission 11 in either the forward or reverse drive ratio precise control over the swash plate inclination may be obtained without affecting the setting of the engine speed control 119 by depressing pedal 106 to cause the inching valve spool 94 to move to the left from the posiion shown. The initial movement of the spool blocks communication through the annular grooves 93 and 97 and connects the inlet-outlet ports 88 and 89 with passageways 91 and 92 through the passages 99 and 101, respectively. Further leftward movement of the inching spool opens a metered flow path between the passageways 91 and 92 through the throttling slots 102. Since the passages 99 and 101 communicate with the passages 91 and 92, respectively, the initial opening of the flow path through the throttling slots function to create a decrease in the fluid pressure in the actuating chamber 57 or 82 with the amount of decrease being precisely controlled by the degree of movement of the inching spool. The decrease in pressure in the actuating chamber allows the centering spring 66 to move the servo pilot piston toward the neutral position, resulting in the directional control valve 33 being moved toward its neutral position and hence a decrease in the transmission drive ratio. Continued leftward movement of the inching valve spool results in a continued decrease in the transmission drive ratio. At the extreme leftward position of the valve spool, the fluid flowing through the passage 99 or 101 passes substantially unrestricted through the throttling slots and the differential pressure between both actuating chambers drops to zero. This permits the servo mechanism to be moved to its centered position resulting in the transmission being shifted to a neutral condition. However, the passages 99 and 101 are sized to act as orifices to restrict fluid flow therethrough so that no pressure drop occurs in the fluid in the conduit 113 or 114 regardless of the position of the inching spool. Thus, since the fluid pressure in the conduit 113 or 114 remains unchanged, the engine speed control will not be moved and the speed of the engine will remain substantially constant.

The centering mechanism 56 provides a fast and efficient means for adjusting the centered position of the servo piston 42 to assure the return of the directional control valve 33 and hence the hydrostatic transmission to a neutral position when the pedal 122 is released and no fluid pressure exists in either of the actuating chambers 57 or 82. Adjustment is accomplished by unscrewing the cap 78 from the protruding end of the threaded sleeve 58, loosening the set screw 61 and rotating the threaded sleeve in the threaded bore 59. Depending upon the direction the threaded sleeve is rotated, the servo pilot piston is moved either leftwardly or rightwardly until the directional control valve is in its neutral position. Once the neutral position of the directional control valve is attained, the set screw is again retightened to lock the threaded sleeve in the adjusted position and the cap is screw threaded onto the protruding end of the threaded sleeve in sealing engagement with the housing 44.

While the invention has been described and shown with particular reference to the preferred embodiment, it will be apparent that variations might be possible that would fall within the scope of the present invention, which is not intended to be limited except as defined in the following claims.

What is claimed is:

1. A control system for a fluid drive vehicle of the type having an engine speed control movable from an idling position to increase engine speed, a fluid drive transmission having a control element movable fron a neutral position progressively to increase the drive ratio and fluid actuator means coupled to the control element for moving it from the neutral position in response to pressurized fluid received by the fluid actuator means, the control system comprising:

auxiliary pump means;
a first fluid circuit connecting the auxiliary pump means to the fluid actuator means including a control valve movable in a first direction from a neutral fluid blocking position progressively to increase the flow of pressurized fluid to the fluid actuator means;
a servo mechanism operatively connected to the control valve for moving it from the neutral position in response to pressurized fluid received by the servo mechanism;

a fluid motor resiliently biased to move the engine speed control to the idling position and operative to move the engine speed control to increase the engine speed in response to pressurized fluid received by the fluid motor; and a second fluid circuit connecting the auxiliary pump means to the servo mechanism and the fluid motor including a pressure control valve manually actuatable from a neutral fluid flow blocking position to an actuated position for providing fluid flow therethrough to the servo mechanism and the fluid motor and for regulating and maintaining the pressure of the fluid delivered to the servo mechanism and the fluid motor at a pressure level commensurate with said actuated position, and an inching valve selectively manually actuatable from an open position which permits substantially unrestricted fluid flow to the servo mechanism to an actuated position restricting fluid flow to the servo mechanism for reducing the pressure of the fluid delivered to the servo mechanism from the pressure control valve while maintaining the pressure of the fluid directed to the fluid motor at the pressure level determined by the pressure control valve.

2. The control system of claim 1 including a foot pedal operatively attached to the pressure control valve for moving the pressure control valve to its actuated position.

3. The control system of claim 1 including follow-up means connected between the control element and the control valve for moving the control valve in a second opposite direction in response to movement of the control element resulting from movement of the control valve in the first direction.

4. The control system of claim 3 wherein said follow-up means includes a lever having one end pivotally attached to the servo mechanism and its opposite end operatively connected to the control element, and means operatively connecting the control valve to an intermediate portion of the lever.

5. The control system of claim 4 including a solenoid valve disposed in the first hydraulic circuit between the auxiliary pump means and the control valve, the solenoid valve being spring biased to a fluid blocking position, and seat actuated switch means for energizing the solenoid valve to an open position when the seat is occupied.

6. The control system of claim 1 wherein said control element of the fluid drive transmission is movable in first and second directions to establish forward and reverse drive ratios, respectively, said control valve is a directional control valve and movable in a second direction from the neutral position for directing fluid to the fluid actuator means for moving the control element in the second direction, said second fluid circuit includes first and second conduits connecting the pressure control valve to the servo mechanism with the first conduit delivering the pressurized fluid to the servo mechanism when the pressure control valve is in said actuated position, said pressure control valve being manually actuatable to another actuated position for directing pressurized fluid through the second conduit to the servo mechanism for moving the control valve in the second direction, and including pressure responsive means connected to the first and second conduits and to the fluid motor and operative to allow pressurized fluid to be directed to the fluid motor from whichever one of the conduits having pressurized fluid therein.

7. The control system of claim 6 including a resilient centering mechanism attached to the servo mechanism for urging it towards the neutral position for returning the control valve to its neutral position.

8. The control system of claim 7 including means for adjusting the position of the centering mechanism and hence the servo mechanism for initially establishing the neutral position of the control valve.

9. The control system of claim 1 wherein the inching valve includes means forming a first flow path for providing substantially unrestricted fluid flow from the pressure control valve to the servo mechanism when the inching valve is in its open position, means forming a restricted fluid flow passage for providing constricted fluid flow from the pressure control valve to the servo mechanism when the inching valve is in said actuated position and means forming a throttling slot for throttling both the fluid flowing through the restricted flow passage and the fluid from the servo mechanism when the inching valve is in its actuated position.

10. A control system for a fluid drive vehicle of the type having an engine speed control element movable from its idling position to increase engine speed, a fluid drive transmission having a control element movable in one direction from a neutral position progressively to increase forward drive ratio and movable in an opposite direction from the neutral position progressively to increase reverse drive ratio and fluid actuator means coupled to the control element for moving it from the neutral position in response to pressurized fluid received by the fluid actuator means, the control system comprising;

auxiliary pump means;

a first fluid circuit connecting the auxiliary pump means to the fluid actuator means, including a directional control valve for controlling flow of pressurized fluid through the first fluid circuit, first and second conduits connecting the control valve to the fluid actuator means, and wherein said control valve is movable from a neutral fluid flow blocking position in a first direction progressively to increase fluid flow through the first conduit to the fluid actuator means for moving the control element in said one direction and in a second direction progressively to increase fluid flow through the second conduit to the fluid actuator means for moving the control element in said opposite direction;

a servo mechanism operatively connected to the control valve and having a centered position for positioning the control valve in its neutral position and movable in first and second directions from the centered position for moving the control valve in the first and second directions, respectively, in response to pressurized fluid received by the servo mechanism;

a fluid motor resiliently biased to move the engine speed control to the idling position and operative to move the engine speed control to increase engine speed in response to pressurized fluid received by the fluid motor; and a second fluid circuit connecting the auxiliary pump means to the servo mechanism and the fluid motor including a pressure control valve having a neutral fluid flow blocking position, first and second conduits connecting the pressure control valve to the servo mechanism for delivering fluid therebetween, said pressure control valve being manually actuatable in a first direction to an actuated position for providing fluid flow therethrough to the first conduit and for regulating and maintaining the pressure of the fluid in the first conduit at a pressure level commensurate with the actuated position and in a second direction to another actuated position for providing fluid flow therethrough to the second conduit and for regulating and maintaining the pressure of the fluid in the second conduit at a pressure level commensurate with the other actuated position, shuttle valve means connected to the first and second conduits to communicate pressurized fluid from either of the first and second conduits of the second circuit to the fluid motor when the pressure control valve is moved to either of the actuated positions and an inching valve disposed in the first and second conduits and having an open position which permits substantially unrestricted fluid flow to the servo mechanism from whichever one of the conduits having pressurized fluid therein, and selectively manually actuatable to an actuated position restricting fluid flow to the servo mechanism from said one conduit for reducing the pressure of the fluid delivered to the servo mechanism while maintaining the pressure of the fluid in said one conduit and the pressure of the fluid directed to the fluid motor at the pressure level determined by the actuated position of the pressure control valve.

11. The control system of claim 10 wherein the inching valve includes means forming first and second fluid flow paths for providing substantially unrestricted fluid flow from the first and second conduits, respectively, to the servo mechanism when the inching valve is in its open position, means forming first and second restricted fluid flow passages for constricting fluid flow from the first and second conduits, respectively, to the servo mechanism when the inching valve is in its actuated position, and means forming a throttling slot for throttling both the fluid from the servo mechanism and fluid from said one conduit through the respective restricted fluid flow passage when the inching valve is in its actuated position.

12. The control system of claim 10 including a foot treadle operatively attached to the pressure control valve for rocking movement to move the pressure control valve to its actuated position.

13. The control system of claim 10 including follow-up means connected between the pump control element and the control valve for feeding back movement of the control element to the control valve to return the control valve toward the neutral position thereof.

14. The control system of claim 13 wherein said follow-up means includes a lever having one end pivotally attached to the servo mechanism and its opposite end operatively connected to the control element, and means operatively connecting the control valve to an intermediate portion of the lever.

15. The control system of claim 14 including a solenoid valve disposed in the first hydraulic circuit between the auxiliary pump means and the control valve, the solenoid valve being spring biased to a fluid blocking position, and seat actuated switch means for energizing the solenoid valve to an open position when the seat is occupied.

16. The control system of claim 15 including a resilient centering mechanism attached to the servo mechanism for urging it towards the centered position for returning the control valve to its neutral position.

17. The control system of claim 16 including means for adjusting the position of the centering mechanism and hence the servo mechanism for initially establishing the neutral position of the control valve.

* * * * *